W. MAGINNIS.
TIRE.
APPLICATION FILED MAR. 26, 1912.

1,077,618. Patented Nov. 4, 1913.

Witnesses
Howard A. Costell
Ross J. Woodward

Inventor
William Maginnis
By E. E. Vrooman
his Attorney.

UNITED STATES PATENT OFFICE.

WILLIAM MAGINNIS, OF OGONTZ, PENNSYLVANIA.

TIRE.

1,077,618.   Specification of Letters Patent.   Patented Nov. 4, 1913.

Application filed March 26, 1912. Serial No. 686,292.

*To all whom it may concern:*

Be it known that I, WILLIAM MAGINNIS, a citizen of the United States, residing at Ogontz, in the county of Montgomery and State of Pennsylvania, have invented certain new and useful Improvements in Tires, of which the following is a specification, reference being had therein to the accompanying drawing.

This invention relates to tires which are used upon automobiles, and the principal object of the same is to provide a tire which will be puncture proof, and which will be free from rim cuts.

Another object of the invention is to so construct the tire that the side walls will be very strongly braced, thus causing all of the bending due to the weight of the machine to come at the junction of the tread and sides, these corners being braced by suitable strips of raw hide, heavy leather, or other material so that the tire will be prevented from cracking. It should also be noted that the tread portion of the tire is constructed in such a manner that the tread portion will not only be thicker than the remaining portion, but will be greatly strengthened by fabric layers embedded in the tread portion.

This invention is illustrated in the accompanying drawings, wherein—

Figure 1:
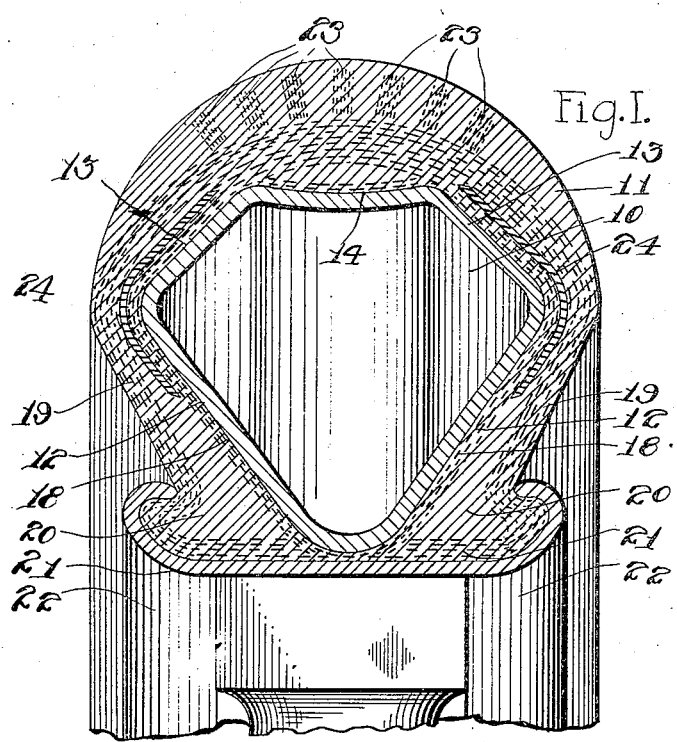
Figure 2:
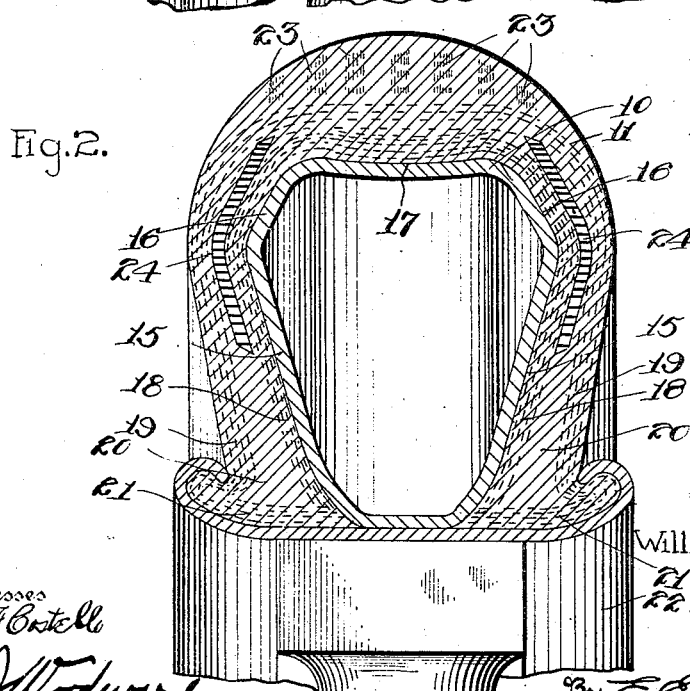

Figure 1 is a sectional view through a tire formed in accordance with this invention. Fig. 2 is a sectional view of a slightly modified form of tire.

Referring to the accompanying drawings, it will be seen that this tire comprises an inner tubing 10 and an outer casing 11, although, if desired the inner tubing shown in Fig. 1 may be omitted and the casing itself inflated. When this type of tire is used, the inner edges of the casing will be joined so as to form an air-tight compartment, and the inflating valve connected directly with the casing, instead of being connected with the inner tube. The casing is formed from suitable material, such for instance as rubber in which there is embedded layers of fabric reinforcement, and at the points of greatest strain layers of raw hide or other heavy leather. The external appearance of this tire is very similar to the tires which are now on the market, but the internal compartment of the tire is of a different shape from those generally used, so that the casing will sustain a great deal more strain. The inner chamber of the tire shown in Fig. 1 is provided with the flared sides 12, and the converging upper portions 13 which are joined by the curved tread face 14. In the form shown in Fig. 2, the side walls 15 are straighter and longer than the side walls 12, and the upper walls 16 which are connected by the curved tread face 17 are also straighter and shorter than the walls 13.

The casing is provided with the internal layers of fabric 18 which are held in spaced relation by the rubber from which the tire is formed, and is also provided with the external layers 19, the external layers being also embedded in rubber and held in spaced relation by the rubber. These two layers of fabric converge toward the tread of the tire so that the side portions of the tire are very thick and greatly strengthened, thus making it very difficult for the sides of the tire to bend under weight. The portion 20 of the tire between the layers 18 and 19 is solid rubber. The fabric layers 18 and 19 are joined by the protecting strip 21, and forms the shoe of the tire which is engaged by the rim 22 of the wheel.

The tread portion of the tire is provided with the curved inner face 17 and is doubly reinforced by the fabric layers 18 and 19 which are brought together so that a substantially solid mass of heavy fabric is formed upon the tread of the tire, the layers of fabric being embedded in the rubber. The layers of fabric 23 which are turned edgeways are wound upon the tread portion of the tire outside the layers 18 and 19 to form additional bracing and protecting means for the tread of the tire, and the entire tread portion of the tire is covered with a thick layer of rubber so that the tire will be given a certain amount of resiliency. It should be noted that since the outer layers 23 are placed edgeways, this protects the tread of the tire from wear so that the rubber cannot wear as quickly as would be the case if the outer layers were placed in the same manner as the layers 18 and 19, and it is, of course, obvious that a greater thickness of fabric reinforcing is obtained with a smaller amount of fabric.

From the construction shown, it will be evident that when the tire is placed upon the machine, that the weight of the machine will cause the tire to bend at the junction of the tread and sides of the tire, and it is, therefore, desired to brace the tire at this point so that the tire will be prevented from splitting. In order to do this, bands 24 of raw-hide, or heavy leather are placed in the tire. Those bands permit the tire to have all the resiliency necessary but prevent the tire from cracking.

By forming the tire as shown, it will be evident that this tire will be practically free from blow-outs and puncture troubles, and it will also be evident that this tire is not liable to have rim cuts, since the side walls of the tire are very strong and cannot bend easy and do not overlap the side flanges of the rim.

What is claimed is:—

A tire casing comprising a body portion having a tread and side walls leading from the tread, the side walls of the casing being gradually tapered to a point adjacent the center of the side walls and being then gradually thickened and merging into the tread whereby the side walls will be substantially V-shape in cross section, and reinforcing bands V-shape in cross section embedded intermediate the height of the side walls to brace the side walls and prevent cracking under pressure.

In testimony whereof I hereunto affix my signature in presence of two witnesses.

WILLIAM MAGINNIS.

Witnesses:
WALTER A. WOOD,
THOMAS C. MAGINNIS.